Nov. 3, 1953     C. K. SHARP     2,657,764
LUBRICANT DISTRIBUTOR AND ECONOMIZER
Filed May 12, 1950
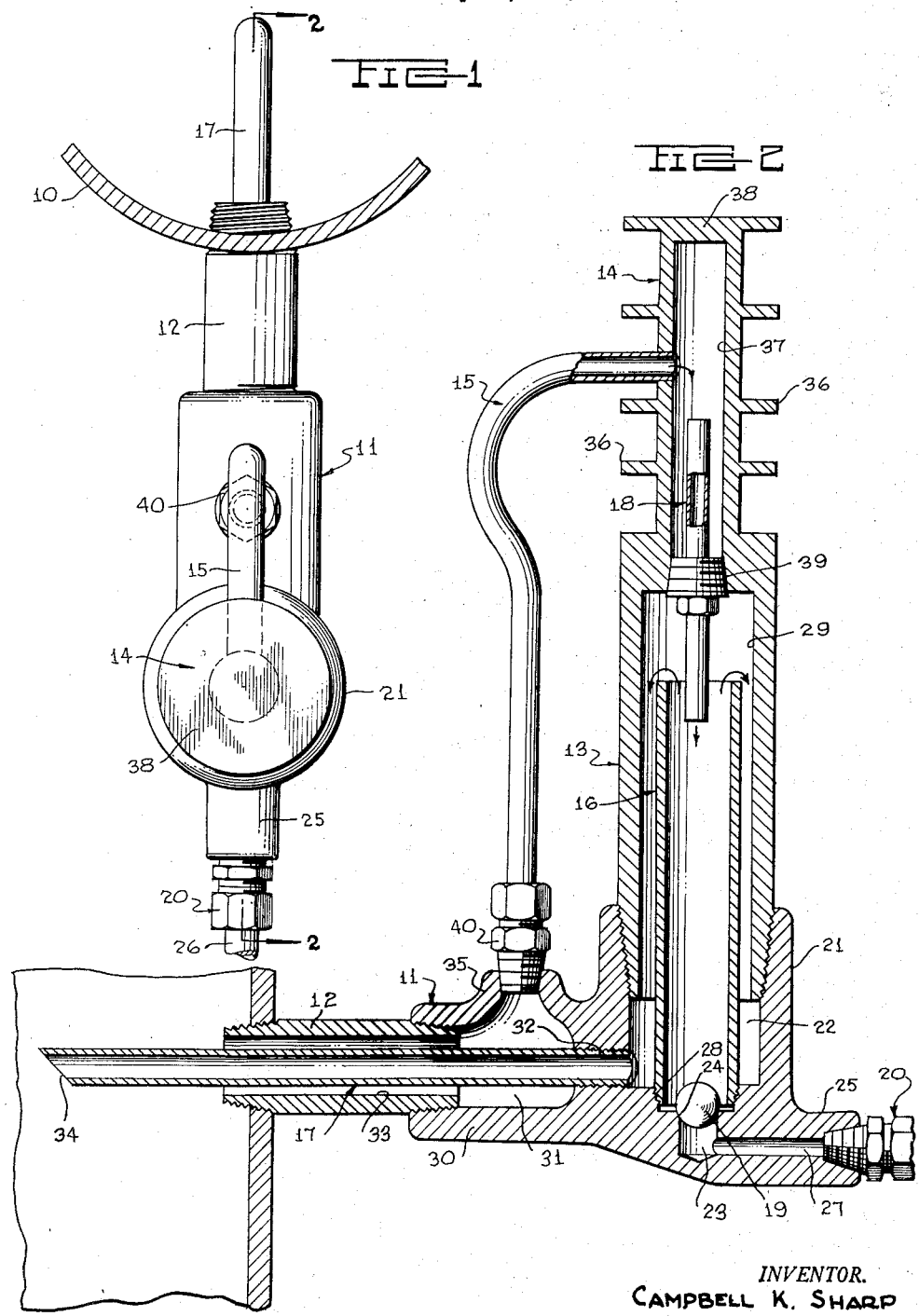
INVENTOR.
CAMPBELL K. SHARP
BY
McMorrow, Berman & Davidson
ATTORNEYS Patented Nov. 3, 1953

2,657,764

UNITED STATES PATENT OFFICE 2,657,764

LUBRICANT DISTRIBUTOR AND ECONOMIZER

Campbell K. Sharp, Memphis, Tenn., assignor to Sharvania Oil & Grease Corp., Memphis, Tenn., a corporation of Tennessee Application May 12, 1950, Serial No. 161,508

4 Claims. (Cl. 184—50)

This invention relates to the art of introducing lubricant into the steam cylinders or chambers and valve or steam chests of such devices as steam engines, steam pumps, steam operated air compressors and steam hammers and more particularly to means for maintaining the optimum distribution of lubricant required for adequate lubrication.

It has long been known that the most effective way to introduce lubricant into a steam cylinder or valve chest is to introduce the lubricant into the steam entering the cylinder through the valve chest and utilize the steam as a vehicle or medium for carrying and distributing the lubricant.

For a long period of time dependence was placed in lubricators feeding cold and concentrated drops of low viscosity oils which would atomize quickly directly into fast moving steam passing through steam cylinders. Various atomizing devices such as, for example, extended quills, perforated slotted pipes and oil preheaters have been previously used. All these efforts left much to be desired in the way of lubrication efficiency since they did not create full effective spreading or dispersion of the whole of the oil with all of the steam which would have given complete distribution. As a result only a small portion reached the vital spots while the remainder escaped out in the exhaust. This not only resulted in excessive waste of lubricant but often in failure to keep all friction surfaces properly lubricated, tending to rapid wear and mechanical failures of the mechanism.

These difficulties were successfully overcome by the lubricant distributing and economizing device disclosed in my Patent No. 2,074,943 issued March 23, 1937, which device effectively vaporizes or atomizes the lubricant and distributes all of the lubricant uniformly through all of the steam passing through a steam main to the steam cylinder of a steam operated mechanism, thereby providing adequate lubrication for all of the friction surfaces with a great economy of lubricant and providing a clean exhaust which does not foul condensers or cause other undesirable results.

Several years of experience with devices of the character described in my patent, referred to above, have demonstrated that, while these devices can and normally do produce the optimum distribution of lubricant into the steam flowing to a steam cylinder, these devices are subject to mechanical difficulties and failures that at times renders their operation unreliable or unsatisfactory. Among such difficulties and failures is the tendency of the condenser components of these devices to become air bound or to form water locks which cause the instruments which are being depended upon in providing adequate lubrication from small quantities of lubricant to immediately and often unknowingly cease functioning. Under some operating conditions the condenser component of the patented device fails to provide a sufficient quantity of condensate for proper and efficient operation, and it also permits the application of steam at the maximum pressure to the force feed lubricator with consequent leakage of steam if there is any wear of the lubricator or imperfection of the connecting line or if the lubricator is detached for replacement or repair. The patented devices have also occasionally suffered damage by freezing of water therein when the steam is shut off in cold weather.

Although many attempts have been made by numerous persons working in this art to overcome the various defects and deficiencies of the prior art devices, no satisfactory solution to these problems was accomplished prior to the completion and testing of the present invention.

It is, therefore, among the objects of the present invention to provide an improved lubricant distributor and economizer which is connectible between a force feed lubricator and a steam main or conduit to convert the lubricant supplied by the lubricator and water condensed from the steam into a mixture of finely divided, dispersed particles resembling a fog or vapor, and to introduce such mixture uniformly and constantly into the steam passing through the main so that substantially all of the steam will carry a sufficient quantity of lubricant to effectively lubricate all of the steam contacted friction surfaces of a steam operated mechanism to which the steam is supplied, which distributor and economizer has an integrally formed housing and condenser unit providing a condenser component that is not disrupted or damaged by the steam pressure nor by temperature variations and which will not become water or air bound under any operative conditions and will always provide an adequate quantity of condensate during operation, which distributor and economizer will not be damaged by freezing of condensate therein and will effectively prevent leakage of steam at all times, which effectively subjects the mixture of lubricant and condensate to the temperature of live steam to provide an ebullition and thorough admixture of the constituents and dispersal of the mixture; which is simple and economical to manufacture and which is strong and durable in construction, positive in operation, easy to assemble and disassemble and not subject to malfunctioning in use.

Other objects and advantages will become apparent from a consideration of the following description and the appended claims in conjunction with the accompanying drawing wherein:

Figure 1 is a top plan view of a lubricant distributor and economizer illustrative of the invention shown in operative assembly with a steam main fragmentarily illustrated; and Figure 2 is a longitudinal medial cross sectional view on the line 2—2 of Figure 1.

With continued reference to the drawing, the improved lubricant distributor and economizer therein illustrated is shown in operative assembly with a steam main 10 and comprises, in general, a base fitting 11, a pipe nipple 12 projecting from one end of the base fitting and threaded into a screw threaded aperture in the steam main, an elongated hollow housing part 13 secured at one end to the base fitting, a steam condenser 14 on the end of the housing part 13 remote from the base fitting, a tube 15 connecting the interior of the condenser with the interior of the base fitting at a location adjacent the pipe nipple 12, an elongated cylindrical mixing cup 16 secured at one end to the base fitting 11 and circumspatially disposed within the housing part 13, a tube 17 extending through the base fitting 11 from a location near the mixing cup 16 and circumspatially through the pipe nipple 12 to a location beyond the distal end of the latter, a condensate overflow tube 18 extending from the interior of the condenser 14 into the open end of the cup 16, a valve ball 19 cooperating with a valve seat in the base fitting at the lower end of the cup 16, and a lubricant supply tube fitting 20 carried by the base fitting 11 at the end of the latter opposite the pipe nipple 12.

The above described assembly operates in the position illustrated in Figure 2 in which the common longitudinal center line or axis of the cup 16, housing part 13, condenser 14 and overflow tube 18 is substantially vertically disposed with the condenser at the top of the assembly, and the common longitudinal center line or axis of the base fitting 11, pipe nipple 12 and tube 17 are substantially horizontally disposed and normal to the first mentioned axis.

The base fitting 11 is an elongated rounded body of metal, preferably formed as a steel forging, and has adjacent one end a hollow cylindrical boss 21 provided with internal screw threads and so disposed that its axis is substantially perpendicular to the longitudinal axis of the base fitting. This boss is of a size to receive the corresponding end of the housing part 13 and this housing part is provided at its end opposite the condenser 14 with external screw threads and is threaded into the boss 21 so that the housing part 13 and the base fitting 11 define a housing or enclosure for the mixing cup 16. A cylindrical chamber 22 is provided in the base fitting at the inner end of the boss 21 and a valve chamber 23, smaller than the chamber 22 and substantially coaxial therewith, is provided in the base fitting at the bottom of chamber 22, the edge at the open end of valve chamber 23 being beveled to provide a valve seat 24 for the check valve ball 19.

An internally screw threaded hollow boss 25 is formed on the end of the base fitting adjacent the boss 21 and receives the fitting 20 by means of which the lubricant supply tube 26 (see Figure 2), which connects the lubricant distributor and economizer to a force feed lubricator, not illustrated, is attached to the base fitting 11. A lubricant channel 27 extends between the interior of the boss 25 and the check valve chamber 23 from which the lubricant is forced past the ball 19 into the bottom end of the mixing cup 16. The mixing cup 16 is an elongated hollow body, preferably, but not necessarily of cylindrical shape, and is provided at its bottom end with external screw threads threaded into an internally screw threaded recess 28 provided in the bottom of chamber 22 surrounding the valve seat at the open end of valve chamber 23.

This provides a construction in which the mixing cup 16 and the housing part 13 are both rigidly secured directly to the base fitting 11 through connections provided by simple machining operations on the base fitting and are firmly held in proper operative relationship to the base fitting and to each other.

The cup 16 has an outside diameter less than the diameter of the bore 29 of housing part 13 and has its upper end spaced from the upper end of bore 29 so that as shown by the arrows in Figure 2, a mixture of lubricant and water boiled in the mixing cup may overflow the top of the cup and pass through the annular space between cup 16 and housing part 13 into space 22 from which it enters tube 17 in egress.

At its end opposite the boss 25 the base fitting is provided with an internally screw threaded, hollow boss formation 30 which receives the externally screw threaded adjacent end of the pipe nipple 12, and a chamber 31 is provided in the base fitting at the inner end of boss 30. An internally screw threaded passage 32 extends between the chambers 31 and 22 and tube 17 is provided at one end with external screw threads threaded into the passage 32 so that the tube has communication with the chamber 22. Tube 17 is smaller than the bore 33 of the pipe nipple 12 and extends through the chamber 31 and the pipe nipple and beyond the outer end of the latter, the outer end of the tube 17 being beveled, as indicated at 34, and directed relative to the direction of flow of steam through the steam main 10 so as to create a slight suction to facilitate passage of lubricant from the chamber 22 through the tube 17 and out into the steam at the outer end of the tube.

Steam from the main flows through the annular space between the tube 17 and the pipe nipple 12 into the chamber 31 and from this chamber through the tube 15 into the condenser 14, as shown by the arrow in Figure 2.

The base fitting is provided near the boss 21 with a smaller hollow boss 35 which communicates with the chamber 31 and is provided with internal screw threads receiving a fitting 40 in which the adjacent end of tube 15 is secured.

The condenser 14, as illustrated, is of hollow cylindrical shape and provided as an integral formation on the outer end of housing part 13. This condenser is provided intermediate its length with an aperture in its wall in which the corresponding end of tube 15 is secured. The housing and condenser unit is formed of a material of high structural strength and good heat conductive characteristics, such as steel or brass, and the condenser has spaced-apart annular ribs or fins 36 on its exterior to increase its heat dissipating ability. These fins may be formed integrally with the condenser body or may be firmly secured thereon as may be desired.

The bore 37 of the condenser is smaller than the bore 29 of the housing part 13 and communicates at one end with bore 29, the other or outer end of condenser bore 37 being closed by end wall 38.

At its end adjacent housing bore 29 condenser bore 37 is internally screw threaded and a screw plug 39 is threaded into this end of the condenser bore. Overflow tube 18 extends through plug 39 and has its lower end disposed within the upper end of mixing cup 16 and its upper end below that end of tube 15 which is connected to the condenser.

It is to be noted that the chamber 22 in the bore 21 of the fitting 11 and the bore 29 in the housing part 13 together constitute a main upstanding chamber, and the bore 37 in the condenser 14 constitutes an upstanding condenser chamber, the condenser chamber being superimposed upon the main chamber and having the lower end integrally connected to the upper end of the main chamber. The chamber 31 constitutes a subsidiary chamber which is arranged in spaced relation with respect to the main chamber.

The check valve ball 19 seats by gravity to prevent the escape of steam into the lubricator when the pumping pressure of the lubricator is released between strokes. In addition, the check valve ball seals the device automatically to prevent the escape of steam when it becomes necessary to disconnect the lubricator for replacement or repairs. This sealing feature eliminates the need for separately attached oil line check valves, extra threaded connections and other parts, thus reducing the cost of production and labor expenses.

The condenser 14 is of sturdy construction and is constructed of one piece with the housing part 13 to eliminate breakage of and leakage between separately attached parts. In the construction shown, the condenser is provided with space above the entrance level of the tube 15 so that no water can accumulate in the space above the entrance level of the steam, since any water which might reach the level of tube 15 will drain down the tube. Thus with steam only in the space in the upper end of the condenser during operation, no water, air or vacuum locks can occur to retard performance.

All the outer surfaces of the condenser and its fins 36 are exposed to low room temperatures, and the steam moves slowly through the condenser, due to an almost balanced pressure throughout the interior of the entire device, so that steam is effectively reduced to water for filling the pocket around the tube 18 to overflow the tube and drain into the mixing cup 16.

The space in the condenser above tube 18 and the space in the housing above cup 16 provide ample room for the expansion of any ice formed in the condenser or cup so that formation of ice in the device will have no damaging effects.

*Operation*

A lubricator feeds lubricant into the bottom of the cup 16 through tube 26, the passage 27, and past ball check valve 19. Steam enters nipple 12 and ascends out of chamber 31 through tube 15 and into condenser chamber 37 in which condensation occurs and fills up the space around the overflow tube 18 with water which overflows tube 18 and drips down into cup 16 to mix with the accumulating lubricant therein. Tube 17 provides a passage through which dry steam enters housing part 13 and surrounds cup 16 with its attendant heat which creates the phenomena of ebullition, a state of turbulence, expansion and foaming of the lubricant and water mixture until it rises and overflows the cup and drops down by gravity and its own expanding force, and passes out through tube 17 into the supply steam for the cylinder and comingles so completely with the steam that the latter literally becomes oiled steam. Thus all cylinder wall, ring and valve surfaces are completely covered with oil at all times, the oil laden steam acting as the lubricant distributing agent in its travel through cylinders.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A device for injecting lubricant in finely divided condition into a steam conduit comprising a base fitting of elongated hollow construction, means at one end of said base fitting for connecting the latter to a steam conduit, means at the other end of said base fitting for connecting the latter to a force feed lubricator, a combined housing part and steam condenser connected at one end to said base fitting intermediate the ends of and in communication with the interior of the latter, said combined housing part and condenser comprising an elongated tubular body upstanding substantially vertically from said base fitting when in operative position and having substantially coaxial bores of different diameter disposed in end-to-end relationship therein with the bore of smaller diameter in said condenser and extending from the end of the bore of larger diameter remote from said base fitting, the end of said bore of smaller diameter remote from said bore of larger diameter being closed, a mixing cup of elongated tubular shape circumspatially disposed in said bore of larger diameter and secured at one end to said base fitting, said mixing cup communicating interiorly with the means for connecting said base fitting to a force feed lubricator, a check valve interposed between said mixing cup and said means for connecting the base fitting to a force feed lubricator to admit lubricant into said mixing cup while precluding passage of steam and condensate through the last-mentioned means, a plug secured in said bore of smaller diameter at the end thereof adjacent said bore of larger diameter, a tube circumspatially disposed in said bores and extending through said plug from a location intermediate the length of said bore of smaller diameter into the adjacent end of said mixing cup for conducting steam condensate from said condenser into said mixing cup, said annular space between said mixing cup and said housing part constituting a steam chamber for boiling a mixture of condensate and lubricant in said mixing cup and causing the mixture to overflow the upper end of said cup into said space, an ejector tube secured at one end in said base fitting and extending circumspatially through the means for connecting said base fitting to a steam conduit, said injector tube communicating at said one end with said space between the mixing cup and the housing part for delivering lubricant and condensate mixture from said space into an associated steam conduit, and means providing a steam passage communicating at one end with the interior of said base fitting adjacent said means for connecting the base fitting to a steam conduit and communicating at its other end with said bore of smaller diameter intermediate the length of the latter for conducting steam into said condenser.

2. A device for injecting lubricant in finely divided condition into a steam conduit comprising a base fitting of elongated hollow construction, a pipe nipple secured to one end and a tube fitting connected to the other end of said base fitting for respectively connecting the latter to a steam conduit and a force feed lubricator, an elongated tubular body closed at one end and secured at its other end to said base fitting intermediate the length of and in communication with the interior of the latter, a mixing cup of elongated shape circumspatially disposed within the bore of said body and secured at one end to said base fitting in communication with said tube fitting, a check valve interposed between said mixing cup and said tube fitting limiting fluid flow therethrough to a direction from said tube fitting to said mixing cup, said mixing cup having its other end disposed intermediate the length of the bore of said body, a plug secured in said bore between said mixing cup and the closed end of said body, a tube circumspatially disposed in said bore and extending through said plug with one end disposed in the adjacent end of said mixing cup and its other end disposed between said plug and the closed end of said body, an injector tube secured at one end in said base fitting in communication with the space between said mixing cup and said body and extending circumspatially through said pipe nipple and beyond the end of the latter remote from said base fitting, and means providing a fluid passage communicating at one end with the interior of said base fitting adjacent said pipe nipple and communicating at its other end with the bore of said body between the closed end of the latter and said plug, the portion of said body at the side of said plug remote from said base fitting constituting a steam condenser.

3. A device for injecting lubricant in finely divided condition into a steam conduit comprising a fitting having a main upstanding chamber, an upstanding condenser chamber superimposed upon said main chamber and having the lower end integrally connected to the upper end of said main chamber, and a subsidiary chamber arranged in spaced relation with respect to said main chamber, means having one end connected to said fitting in communication with said subsidiary chamber and having the other end adapted for connection to a steam conduit, an ejector tube having one end connected to said fitting in communication with the lower end portion of said main chamber and extending through said means and having the other end adjacent to and spaced outwardly of the other end of said means, said tube being spaced from said means and forming a passage for the ingress of steam when the other end of said means is connected to a steam conduit, an upstanding mixing cup fixedly positioned within and spaced from said main chamber and having the upper end adjacent to and spaced below the upper end of said main chamber, the space between said mixing cup and said main chamber forming a passageway, there being a channel in said fitting having one end connected in communication with the interior of said mixing cup and having the other end adapted to be connected to a forced feed lubricator, a tube connecting said subsidiary chamber to said condenser chamber intermediate the ends of the latter, and an upstanding condensate overflow tube fixedly supported in the integrally connected ends of said main and condenser chambers and having the upper end extending into and terminating adjacent to and spaced below said tube connection with said condenser chamber and having the lower end extending into and terminating adjacent to and spaced below the upper end of said mixing cup.

4. A device for injecting lubricant in finely divided condition into a steam conduit comprising a fitting having a main upstanding chamber, an upstanding condenser chamber superimposed upon said main chamber and having the lower end integrally connected to the upper end of said main chamber, and a subsidiary chamber arranged in spaced relation with respect to said main chamber, means having one end connected to said fitting in communication with said subsidiary chamber and having the other end adapted for connection to a steam conduit, an ejector tube having one end connected to said fitting in communication with the lower end portion of said main chamber and extending through said means and having the other end adjacent to and spaced outwardly of the other end of said means, said tube being spaced from said means and forming a passage for the ingress of steam when the other end of said means is connected to a steam conduit, an upstanding mixing cup fixedly positioned within and spaced from said main conduit and having the upper end adjacent to and spaced below the upper end of said main chamber, the space between said mixing cup and said main chamber forming a passageway, there being a channel in said fitting having one end connected in communication with the interior of said mixing cup and having the other end adapted to be connected to a forced feed lubricator, a check valve interposed in the communication connection of the one end of said channel with the interior of said mixing cup for controlling the admission of lubricant to said cup, a tube connecting said subsidiary chamber to said condenser chamber intermediate the ends of the latter, and an upstanding condensate overflow tube fixedly supported in the integrally connected ends of said main and condenser chambers and having the upper end extending into and terminating adjacent to and spaced below said tube connection with said condenser chamber and having the lower end extending into and terminating adjacent to and spaced below the upper end of said mixing cup.

CAMPBELL K. SHARP.

References Cited in the file of this patent

UNITED STATES PATENTS

| Number | Name | Date |
|---|---|---|
| 187,964 | Clark | Mar. 6, 1877 |
| 1,905,136 | Bliss | Apr. 25, 1933 |
| 2,074,943 | Sharp | Mar. 23, 1937 |
| 2,196,685 | Schultz | Apr. 9, 1940 |